(12) United States Patent
Bargman

(10) Patent No.: US 9,635,846 B2
(45) Date of Patent: May 2, 2017

(54) BARGE ASSISTANT ROD SAVER

(71) Applicant: Charleston Bargman, Miami, FL (US)

(72) Inventor: Charleston Bargman, Miami, FL (US)

(*) Notice: Subject to any disclaimer, the term of this patent is extended or adjusted under 35 U.S.C. 154(b) by 0 days.

(21) Appl. No.: 14/545,539

(22) Filed: May 18, 2015

(65) Prior Publication Data
US 2016/0338333 A1 Nov. 24, 2016

(51) Int. Cl.
A01K 87/00 (2006.01)
A01K 97/10 (2006.01)
A01K 99/00 (2006.01)
F16M 13/04 (2006.01)
A01K 97/00 (2006.01)
A01K 69/00 (2006.01)
A01K 71/00 (2006.01)
A01K 73/00 (2006.01)
A01K 75/00 (2006.01)
A01K 79/00 (2006.01)
A01K 87/04 (2006.01)
A01K 87/08 (2006.01)
A47B 97/00 (2006.01)
A47G 29/00 (2006.01)
F16M 11/00 (2006.01)
A01K 97/08 (2006.01)
A01K 97/12 (2006.01)

(52) U.S. Cl.
CPC .............. *A01K 97/10* (2013.01); *A01K 99/00* (2013.01); *F16M 13/04* (2013.01); *A01K 87/00* (2013.01); *A01K 87/007* (2013.01); *A01K 87/08* (2013.01); *A01K 97/08* (2013.01); *A01K 97/12* (2013.01)

(58) Field of Classification Search
CPC ........ A01K 87/00; A01K 97/00; A01K 87/08; A01K 97/10; A47B 2097/008; A47B 91/08; B60P 7/0823; B61D 45/001; E05B 73/0005

USPC .............. 248/692, 693, 500, 506, 364, 910; 43/18.1 R, 23, 21.2, 25, 4, 4.5; 119/712, 119/769, 786, 791; 292/267; 70/57, 59, 70/60, 181; 114/364; 52/166
See application file for complete search history.

(56) References Cited

U.S. PATENT DOCUMENTS

| | | | | |
|---|---|---|---|---|
| 719,603 A * | 2/1903 | McNamee | ................ | E04B 1/19 135/114 |
| 843,543 A * | 2/1907 | Matsumoto | .............. | A01K 1/04 114/294 |
| 1,001,195 A * | 8/1911 | Gillette | .................. | A01K 87/08 43/23 |
| 1,930,342 A * | 10/1933 | Graham | ............. | A63B 69/3632 473/232 |

(Continued)

*Primary Examiner* — Brian Mattei
*Assistant Examiner* — Taylor Morris

(57) ABSTRACT

Losing your best/favorite reel and rod while fishing, is devastating. I have lost a few. I have observed other fishermen losing reels and rods also due to fish pullover. The fish were literally taking our reels and rods. I said, "There has to be a solution." I began experimenting with many items from boat holders to bungee cords; from hard materials to soft materials and spikes to rope tees. Nothing worked until I put together The Barge Assistant Rod Saver. The Barge Assistant Rod Saver consists of: a hook, link chain, screws, washers, holding nut and a round weight. This was designed to prevent immediate rod pullover on a fish initial strike. The results were astonishing. The Barge Assistant Rod Saver allowed me time to get to my fishing rods before losing them. I have not lost a rod as a result of using The Barge Assistant Rod Saver.

1 Claim, 2 Drawing Sheets

THE BARGE ASSISTANT ROD SAVER PARTS

THE BARGE ASSISTANT ROD SAVER ATTACHED TO ROD

(56) References Cited

U.S. PATENT DOCUMENTS

| | | | | |
|---|---|---|---|---|
| 2,018,923 A * | 10/1935 | Potter | A01K 87/00 43/18.1 R |
| 2,413,596 A * | 12/1946 | Wood, Jr. | B63B 21/46 114/299 |
| 3,293,789 A * | 12/1966 | Pack | A01K 97/10 248/514 |
| 3,834,057 A * | 9/1974 | Jansa | A01K 97/10 248/533 |
| 4,007,902 A * | 2/1977 | Pettee | A01K 97/10 248/156 |
| 4,021,958 A * | 5/1977 | Snodie | A01K 97/12 43/17 |
| 4,995,188 A * | 2/1991 | Ewing | A01K 97/00 177/127 |
| 5,092,554 A * | 3/1992 | Gibbs | B60K 17/00 248/339 |
| 5,511,293 A * | 4/1996 | Hubbard et al. | 24/442 |
| 5,704,582 A * | 1/1998 | Golembiewski et al. | 248/500 |
| 5,815,977 A * | 10/1998 | Hill, Jr. | 43/25 |
| 5,992,080 A * | 11/1999 | Allen | A01K 97/11 43/15 |
| 6,089,652 A * | 7/2000 | Miller, Sr. | 297/68 |
| 6,164,245 A * | 12/2000 | Johnson | A01K 27/002 119/712 |
| 6,435,137 B1 * | 8/2002 | Hourihan | A01K 1/04 119/786 |
| 6,578,528 B1 * | 6/2003 | Brown | A01K 1/04 119/769 |
| 6,964,277 B2 * | 11/2005 | Naber | 135/16 |
| 7,146,763 B1 * | 12/2006 | Stanton | 43/21.2 |
| 7,478,498 B1 * | 1/2009 | Barnhart | A01K 97/12 43/17 |
| 2004/0093786 A1 * | 5/2004 | Borgeat | A01K 87/06 43/18.1 R |
| 2007/0266616 A1 * | 11/2007 | Rienzo | 43/21.2 |

\* cited by examiner

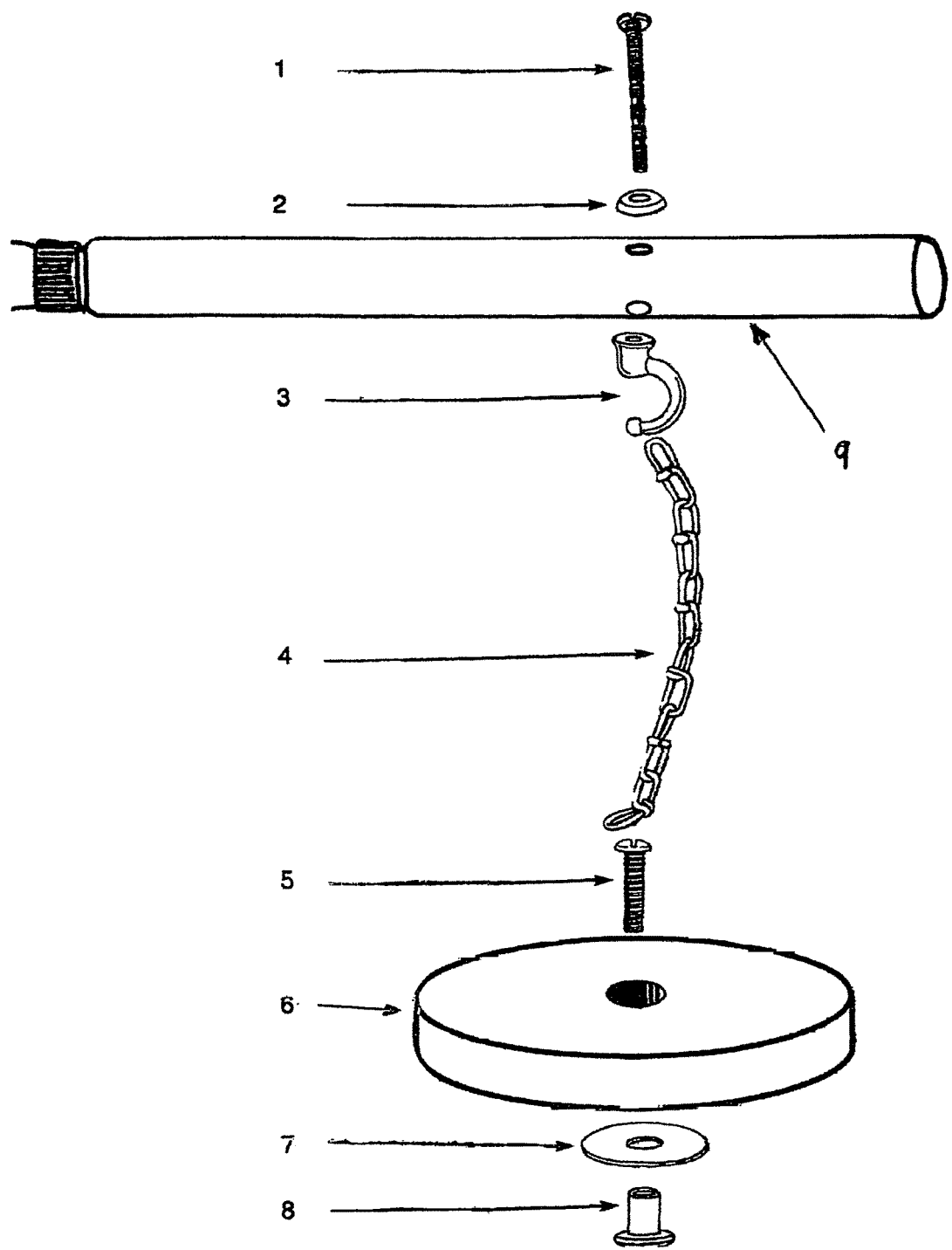
THE BARGE ASSISTANT ROD SAVER PARTS FIG. (1)

THE BARGE ASSISTANT ROD SAVER ATTACHED TO ROD FIG. (2)
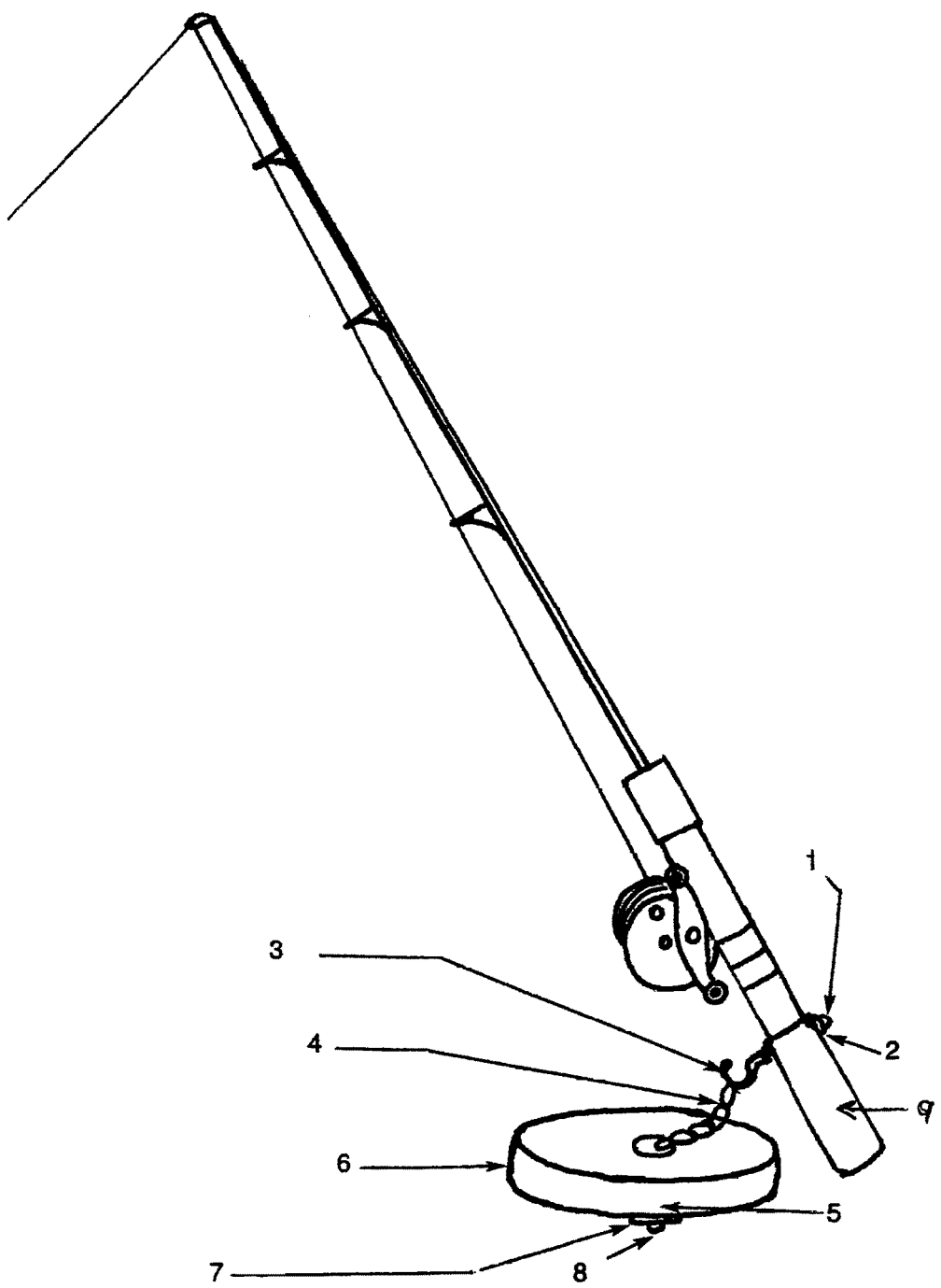

BARGE ASSISTANT ROD SAVER

BACKGROUND OF THE INVENTION

There were trial and errors trying to prevent rods from being pulled into the water. Other Rod savers researched were basic rod holders. While fishing I tried rubber, string, wood, bungee rope, etc. Finally, I was successful using a link chain with a hook and round weights secured to the rod.

BRIEF SUMMARY OF THE INVENTION

The Barge Assistant Rod Saver is not only a rod holder, but it also assists the fisherman in securing his rod(s) by stabilizing the rod position and preventing rod pull over or loss. The Barge Assistant Rod Saver is an assembled combination of a hook screw, hook screw washer, save hook, chain, chain screw, weight, holding nut washer and a holding nut. This assembly attaches to the rod to assist the fisherman in securing his rod.

BRIEF DESCRIPTION OF THE SEVERAL VIEWS OF THE DRAWING(S)

FIG. 1 shows an exploded view of the Barge Assistant Rod Saver

FIG. 2 shows an assembled view of the Barge Assistant Rod Saver

DETAILED DESCRIPTION OF THE INVENTION

The Barge Assistant Rod Saver is a combination of different items put together to assist in securing a rod.

FIG. 1 shows an exploded view of the assembly and the location and connection points of each of the parts. The hook screw (1) is designed to hold the save hook (3) to the handle of a rod (9). The hook screw extends through a hole in the handle of the rod. The hook screw washer (2) is designed to prevent the hook screw (1) from entering the hole drilled into the rod (9). The save hook (3) is threaded onto the hook screw (1) and holds a chain (4) thereon by attaching/placing a link of the chain over the tip of the save hook (3), thus securing it to the rod. The chain attaches to the save hook and connects to the chain screw (5). The chain screw (5) is placed within a link of the chain (4) and extends through a hole in the weight to secure the chain to the weight (6). The chain screw is then secured thereto by a holding nut (8) and a holding nut washer (7) which prevents the holding nut from entering/passing through the hole of the weight. The weight (6) is designed to stabilize the chain and provide resistance to pulling forces on the rod which might otherwise cause the rod to be pulled into the water.

To prepare the save hook for assembly, a user must measure on a rod where the save hook is to be placed. The user then drills a hole in the rod. Placing the save hook (3) over the hole, the hook screw (1), with hook screw washer (2) thereon, is placed through the hole and is inserted into the save hook and tightened/secured thereto.

To prepare the weight for assembly, the holding washer (7) is placed on the holding nut (8) and the holding nut is placed into a hole of the weight (6). The chain screw (5) is inserted through a link in the chain and placed into the holding nut and tightened. It is important the chain extends through the top of the weight, reaching the save hook on the rod to attach the weight to the rod. The holding washer must be large enough to secure the holding nut (8) at the bottom of the weight (6).

The Barge Assistant Rod Saver is very useful in securing the rod when fishing on a bride and also allows fishermen to use multiple rods without the fear of losing them as a result of a pulling force.

The invention claimed is:

1. A Barge Assistant Rod Saver for attachment to a fishing rod that will assist in preventing immediate rod pullover into water on fish initial strike, comprising:
    a hook screw configured to extend through a hole in a handle of a fishing rod;
    a hook screw washer placed on the hook screw to prevent the hook screw from passing completely through the hole in the handle;
    a save hook threaded onto the hook screw;
    a link chain having a first end and a second end, wherein the first end of the chain is attached to the save hook;
    a chain screw;
    a weight having a hole therethrough;
    a holding nut and a holding nut washer, wherein the holding nut extends through the hole in the weight such that the holding nut washer prevents the holding nut from passing completely through the hole of the weight;
    wherein the chain screw is attached to the chain adjacent the second end to secure the chain to the weight such that the rod saver is configured to provide resistance to pulling forces on the rod.

* * * * *